(12) United States Patent
Imase

(10) Patent No.: US 7,900,890 B2
(45) Date of Patent: Mar. 8, 2011

(54) WORM-RACK TYPE TRANSMISSION DEVICE

(75) Inventor: Kenji Imase, Aichi (JP)

(73) Assignee: Kamoseiko Kabushiki Kaisha, Aichi (JP)

(*) Notice: Subject to any disclaimer, the term of this patent is extended or adjusted under 35 U.S.C. 154(b) by 193 days.

(21) Appl. No.: 12/391,762

(22) Filed: Feb. 24, 2009

(65) Prior Publication Data

US 2010/0044656 A1 Feb. 25, 2010

(30) Foreign Application Priority Data

Feb. 25, 2008 (JP) .................................. 2008-042451

(51) Int. Cl.
*B66F 3/08* (2006.01)
(52) U.S. Cl. ................................ 254/96; 254/100; 254/98
(58) Field of Classification Search ................ 254/96, 254/98, 418, 425, 97, 100, 134, 92
See application file for complete search history.

(56) References Cited

U.S. PATENT DOCUMENTS

| | | | | | |
|---|---|---|---|---|---|
| 3,903,941 | A | * | 9/1975 | Eisenberg | 141/78 |
| 4,080,915 | A | * | 3/1978 | Bompard et al. | 112/412 |
| 5,937,459 | A | * | 8/1999 | Binaghi et al. | 5/634 |
| 6,231,269 | B1 | * | 5/2001 | Shear et al. | 405/198 |
| 7,163,207 | B2 | * | 1/2007 | Baird et al. | 280/6.153 |
| 2009/0101877 | A1 | * | 4/2009 | Zaguroli, Jr. | 254/267 |
| 2009/0267035 | A1 | * | 10/2009 | Wood et al. | 254/98 |
| 2010/0044656 | A1 | * | 2/2010 | Imase | 254/96 |

FOREIGN PATENT DOCUMENTS

| JP | S52-97498 | 8/1977 |
|---|---|---|
| JP | 09-328971 | 12/1997 |
| JP | 2007-120636 | 5/2007 |

* cited by examiner

*Primary Examiner* — Lee D Wilson
(74) *Attorney, Agent, or Firm* — Morgan, Lewis & Bockius LLP

(57) ABSTRACT

In a worm-rack type transmission device (1), a curved side portion (6) is provided on rack teeth (2*a*) of a linear rack (2) in a manner to form a part of an ellipsoidal surface (E) and twisted by a changing rate (θ) of a torsional manner a toothed streak (5) of a worm wheel (3). The worm wheel (3) brings the toothed streak (5) into engagement with the curved side portion (6) in a line-to-line contact, enabling to a self-locking property and strengthening a transmission power to insure a high transmission efficiency with a least friction loss so as effectuate a linear drive for an extended distance travel with a high precision.

5 Claims, 5 Drawing Sheets

WORM-RACK TYPE TRANSMISSION DEVICE

BACKGROUND OF THE INVENTION

1. Field of the Invention

The invention relates to a worm-rack type transmission device which has a worm wheel and a linear rack to transmit the former rotational movement to the latter to convert it as a linear movement, and particularly to a worm-rack type transmission device in which the worm wheel is formed into a frustocone-shaped configuration.

2. Description of Prior Art

In a worm-rack type transmission device well-suited to transfer a large-scaled machine tool as shown in FIG. 7, a worm wheel 50 is placed on a half-nut type rack 51 with a worm tooth 50a engaged against a rack tooth 51a of a linear rack 51. The worm wheel 50 directs its shaft 50b in parallel with an axial direction of the linear rack 51.

Upon rotating the worm wheel 50 by way of an electric motor (not shown), the linear rack 51 moves in its lengthwise direction N to actuate a robot arm (not shown) of the machine tool so as to transfer component parts of machinery.

Since the worm tooth 50a meshes with the rack tooth 51a substantially through a semi-circular area, it is well-suited to transfer elongate machine tools due to an increased transmission power from the worm wheel 50 to the linear rack 51.

However, the structure is such that the worm wheel 50 is placed in parallel with the linear rack 51 so as to restrict a vacant space between the worm wheel 50 and the linear rack 51 for connecting an electric motor and a power transmission mechanism (e.g., gear train) to the worm wheel 50, thus structurally complicating the power transmission mechanism.

As another example of the worm-rack type transmission device, represented is a scroll chuck device 52 as shown in FIG. 8. The scroll chuck device 52 is employed to chuck a work piece in an engine lathe, and has a spiral tooth band 52a set as a scroll on an upper surface of a rotatable table 53. The spiral tooth band 52a is profiled along Archimedean curve and have three rack pieces 54 to be engaged with the tooth band 52a.

Upon operating a pinion 55 through a handle 57 with the pinion 55 meshed against a circumferential teeth 56, the spiral tooth band 52a rotates together with the table 53 to convergently travel the rack pieces 54 toward a central portion G along a radial direction L so as to clasp a work piece (not shown).

The spiral tooth band 52a meshes with the rack pieces 54 through a larger area upon reciprocally traveling the rack pieces 54 concurrently. However, it is impossible to travel the rack pieces 54 beyond the central portion G to limit an amount of their travel which the rack pieces 54 can move, so as to make the scroll chuck device 52 unsuitable for an extended distance travel.

In order to mitigate the above disadvantages, a semi-open type side door has been introduced by a reference of Laid-open Japanese Patent Application No. 9-328971. The reference discloses a rack-shaped plate 21 and a scroll-shaped tooth 23 defined on a adjustment gear 22. This enables a rack tooth 25 to move beyond a central portion of the scroll-shaped tooth 23.

However, it is necessary to fully turn the scroll-shaped tooth 23 in order to advance rack-shaped plate 21 by one single pitch along the rack tooth 25. This lengthens a sliding distance of the scroll-shaped tooth 23 against the rack tooth 25, thus necessitating a strengthened drive power with no small friction loss accompanied, making it unsuitable to apply the scroll-shaped tooth 23 to the machine tools in the mechanical industry.

In general, in the worm wheel type transmission device with the worm wheel incorporated into a helical gear, the device has been extensively used because of its increased power transmission and self-locking property with a high precision albeit unsuitable for the usage of the extended distance travel.

In the pinion-rack mechanism, although it is suitable for the usage of the extended distance travel, it has no self-locking property and lacks an increased power transmission because of the limited number of teeth in which the pinion meshes with the rack.

With the above in mind, it has been desirable to introduce a power transmission device in which the advantages of the worm wheel type transmission device are taken in and its drawbacks are compensated, while at the same time, the advantages of the pinion-rack mechanism are taken in and its drawbacks are compensated.

Therefore, it is an object of the invention to provide a worm-rack type transmission device which enables to a self-locking property and strengthening a transmission power to insure a high transmission efficiency with a least friction loss so as effectuate a linear drive for an extended distance travel with a high precision.

SUMMARY OF THE INVENTION

According to the invention, there is provided a worm-rack type transmission device in which an outer surface of a linear rack has a large number of rack teeth at predetermined pitch intervals. A worm wheel has a frustocone-shaped body, an outer surface of which has a series of a toothed streak helically running therealong in registry with the rack teeth from a minimum diameter portion to a maximum diameter portion of the frustocone-shaped body at the same pitch intervals as the linear rack has. A curved side portion is provided on a side surface of each of the rack teeth to be in registry with the toothed streak to have a recess profiled by a part of an ellipsoidal surface along a face-width direction of the rack teeth with a major diameter of the ellipsoidal surface in parallel with the rack teeth. The major diameter is a radius of curvature equal to that of any portion of the toothed streak residing from the minimum diameter portion to the maximum diameter portion. The curved side portion is twisted against the face-width in a torsional direction of the toothed streak corresponding to a changing rate of a torsional manner of the toothed streak. The worm wheel is placed on the linear rack with the worm wheel inclined to form a predetermined angle against the linear rack, so as to bring the toothed streak into engagement with the curved side portion, so that the worm wheel transmits its rotational movement to the linear rack to convert the rotational movement into a linear movement upon rotationally driving the worm wheel.

With the curved side portion having the recess profiled by a part of an ellipsoidal surface and twisted with the changing rate of the torsional manner of the toothed streak, the worm wheel engages toothed streak with the corresponding curved side portions of the rack teeth in a line-to-line contact.

This enables to strengthening a transmission power to insure a high transmission efficiency with a least friction loss so as to effectuate a linear drive for an extended distance travel with a high precision.

With the toothed streak engaged against the curved side portion of the rack teeth, it is possible to prohibit the lengthwise movement of the linear rack so as to effectuate the self-locking property as long as the worm wheel remains unturned.

According to other aspect of the invention, the ellipsoid surface has the major diameter equal to a radius of curvature in which the toothed streak resides at the maximum diameter portion, and having a minor diameter equal to a radius of curvature in which the toothed streak resides at the minimum diameter portion.

This strengthens the engagement of the toothed streak against the curved side portion to more effectuate the advantages as mentioned in claim 1.

According to other aspect of the invention, an electric motor is provided to be connected to one end of the worm wheel remote from the linear rack in alignment with the worm wheel.

With the worm wheel inclined against the linear rack, it is possible to secure an extra space between the worm wheel and the linear rack. This leads to connecting the motor to the rear end of the worm wheel in alignment with the worm wheel, so as to structurally simplify the gear train (power transmission mechanism).

According to other aspect of the invention, the linear rack is vertically set on a stand, and the worm wheel is incorporated into a carriage lift together with an electric motor.

The carriage lift is used to carry goods and baggage, or used to send an operator to work at high elevation. With the power transmission mechanism simplified as mentioned in claim 3, it is possible to make the carriage lift compact and lightweight with the convenient self-locking mechanism attained.

According to other aspect of the invention, the rack teeth of the linear rack gradually curves zigzag in a sigmoidal fashion along the face-width direction of the rack teeth.

With the rack teeth curved in the sigmoidal fashion, it is possible to strengthen the engagement between the curved side surface and the toothed streak so as to insure a more relevant power transmission.

BRIEF DESCRIPTION OF THE DRAWINGS

Preferred forms of the present invention are illustrated in the accompanying drawings in which.

DETAILED DESCRIPTION OF THE PREFERRED EMBODIMENTS

Figure 2:
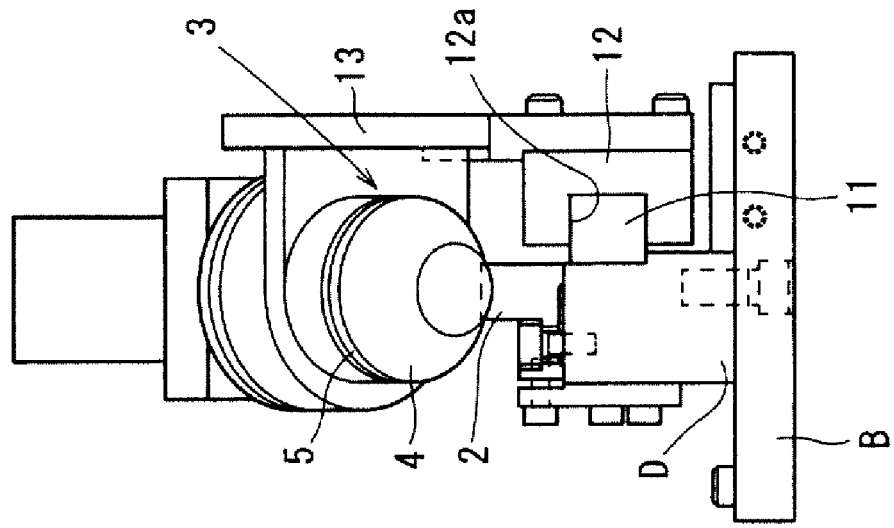
FIG. 2 is a plan view of the worm-rack type transmission device.

In the following description of the depicted embodiments, the same reference numerals are used for features of the same type.

Referring to FIGS. 1 through 4 which show a worm-rack type transmission device 1 according to a first embodiment of the invention, the worm-rack type transmission device 1 is used to a robot arm of a large-scaled machine tool installed in a floor of a machining factory.

Figure 1:
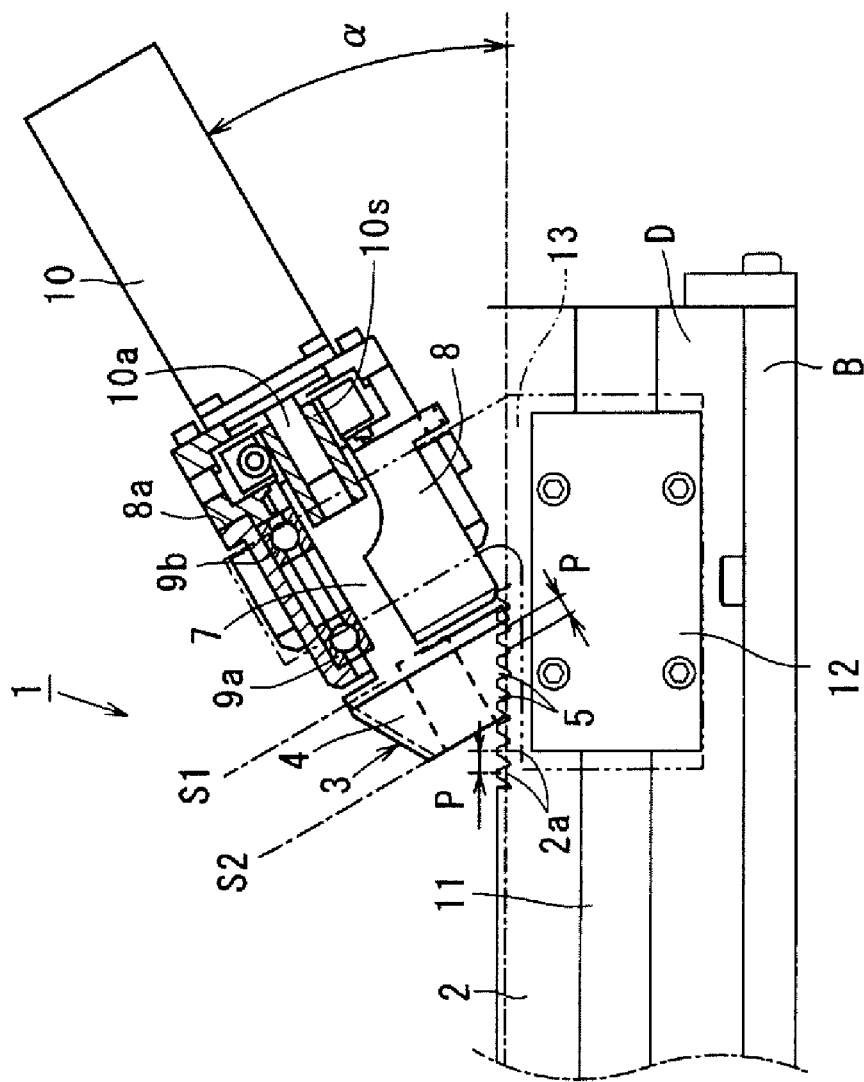
FIG. 1 is a longitudinal cross sectional view of a main part of a worm-rack type transmission device according to a first embodiment of the invention.

In the worm-rack type transmission device 1, a linear rack 2 is made of a metallic material (e.g., iron or mild steel) substantially rectangular in cross section, and placed on a metallic beam D installed on a base plate B as shown in FIGS. 1, 2. The linear rack 2 is adapted to slide along a lengthwise direction of the metallic beam D, and having a number of rack teeth 2a at predetermined pitch intervals P. As a tooth profile, the rack teeth 2a are substantially trapezoidal in cross section.

A worm wheel 3 has a frustocone-shaped body 4 which is made of the metallic material (e.g., iron or mild steel). An outer surface of the frustocone-shaped body 4 integrally has a series of toothed streak 5 helically running therealong at the same pitch intervals P as the rack teeth 2a from a maximum diameter portion S1 to a minimum diameter portion S2 of the frustocone-shaped body 4. The toothed streak 5 forms a plurality of helices on outer surface of the frustocone-shaped body 4. The toothed streak 5 is profiled substantially trapezoidal in cross section which is the same as the rack teeth 2a.

Figure 3:
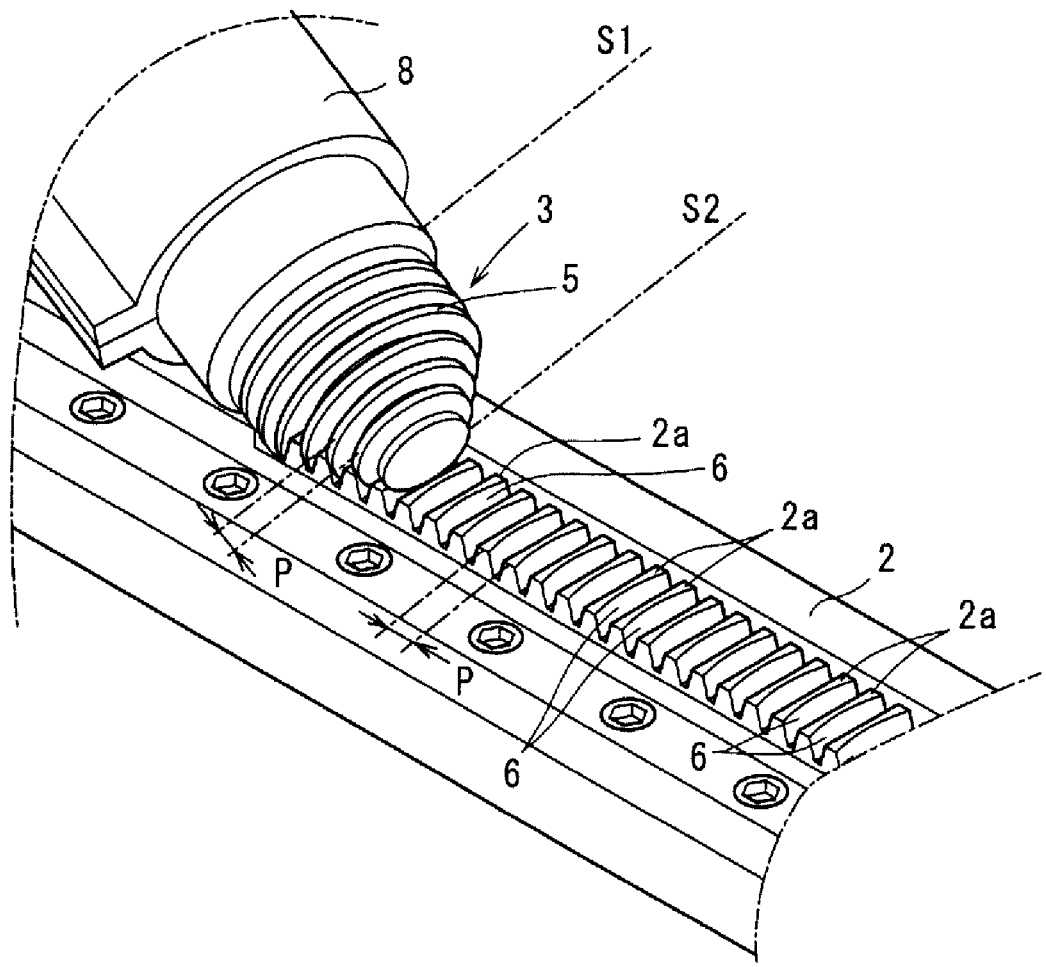
FIG. 3 is a perspective view of a main part of the worm-rack type transmission device.

As shown in FIG. 3, the worm wheel 3 is positioned in coplanar relationship with the linear rack 2, and inclines by a predetermined angle α (e.g., 30 degrees) against the linear rack 2 upon bringing the toothed streak 5 into engagement with the rack teeth 2a.

Figure 4:
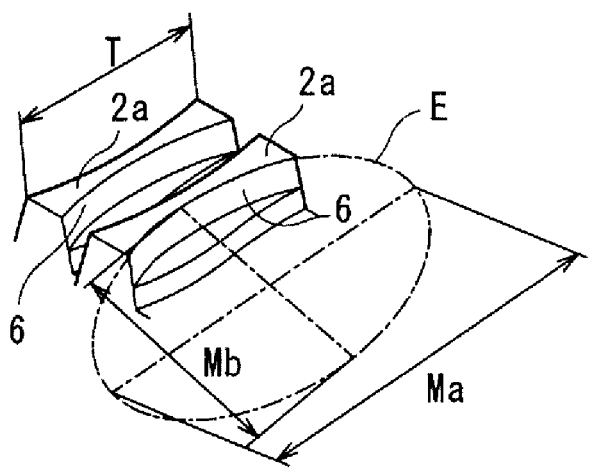
FIG. 4 is a perspective view of rack teeth shown in chief to describe the rack teeth.

Each side surface of the rack teeth 2a has a recess along the face-width direction T in correspondence to the toothed streak 5 so as to form a curved side portion 6. The curved side portion 6 is profiled along a part of an ellipsoidal surface E as shown in FIG. 4.

Figure 5:
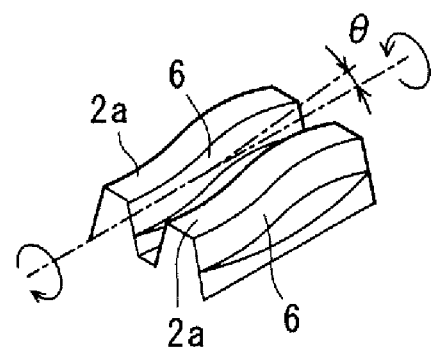
FIG. 5 is a perspective view of the rack teeth.

As shown in FIG. 5, the curved side portion 6 is further twisted against or around the face-width T along a torsional direction of the toothed streak 5 with a changing rate (θ) of a torsional manner of the toothed streak 5.

In FIG. 5, the rack teeth 2a gradually curves zigzag in a sigmoidal fashion along the face-width direction T of the rack teeth 2. For the purpose of graphical convenience, the rack teeth 2 are depicted substantially uniform at their thickness dimension.

The toothed streak 5 forms a torsional angle against an axial line of the frustocone-shaped body 4, and the torsional angle tends to increase more as approaching the maximum diameter portion S1. This produces the changing rate (θ) in the torsional angle each time when the toothed streak 5 circumferentially makes one single turn around an axial direction of the frustocone-shaped body 4.

The ellipsoid surface E has a major diameter Ma set in parallel with the face-width direction T of the rack teeth 2a and equal to radius of curvature of any portion of the toothed streak 5 residing from the minimum diameter portion S2 to the maximum diameter portion S1.

By way of illustration, the major diameter Ma is determined to be equal to a radius of curvature residing at the maximum diameter portion S1. The ellipsoid surface E has a minor diameter Mb equal to the minimum diameter portion S2.

Upon rotationally driving the worm wheel 3 with the toothed streak 5 engaged against the curved side portion 6, the rotational movement of the worm wheel 3 is converted into a linear movement by the linear rack 2.

To a rear end of the worm wheel 3, integrally connected is an input shaft 7 which is accommodated into a housing 8 as shown in FIG. 1. Between the input shaft 7 and the housing 8, roller bearings 9a, 9b are placed to support the input shaft 7. To a rear end 8a of the housing 8 remote from the linear rack 2, connected is an electric motor 10 in alignment with the housing 8 to rotationally drive the worm wheel 3 as a drive system. The motor 10 has a rotary shaft 10a connected to the input shaft 7 which passes through a sleeve 10s.

The linear rack 2 has one side surface, to which a guide bar 11 is attached along a lengthwise direction. On the guide bar 11, slidably mounted is a slider plate 12 which has a lengthwise groove 12a to accommodate the guide bar 11 as shown in FIG. 2. A guide plate 13 connects the slider plate 12 to the housing 8 so as to hold the worm wheel 3 engaged with the linear rack 2.

Upon energizing the motor 10 with the worm wheel 3, the housing 8 and the motor 10 each fixed to the stationary member (not shown) independent of the linear rack 2, the motor 10 transmits its rotational power to the worm wheel 3 by way of the rotary shaft 10a and the input shaft 7.

Since the worm wheel 3 engages the toothed streak 5 with the curved side portion 6, the rotational power of the motor 10 is transformed into the linear movement which drives the linear rack 2 in the lengthwise direction. With the guide plate 13 actuated to slide along the guide bar 11 in the lengthwise direction, the guide plate 13 helps keep the worm wheel 3 in coplanar relationship with the linear rack 2.

When the worm wheel 3, the housing 8 and the motor 10 are set free from the stationary member while fixing the linear rack 2 to the floor through the base plate B, the worm wheel 3 lengthwisely moves together with the housing 8 and the motor 10 along the linear rack 2.

With the curved side portion 6 having the recess profiled by a part of the ellipsoidal surface E and twisted with the changing rate (θ) of the torsional manner of the toothed streak 5, the toothed streak 5 engages against the rack teeth 2a in a line-to-line contact.

This enables to strengthening a transmission power to insure a high transmission efficiency with a least friction loss so as to effectuate a linear drive for an extended distance travel with a high precision.

With the toothed streak 5 engaged against the curved side portion 6 of the rack teeth 2a, it is possible to prohibit the lengthwise movement of the linear rack 2 so as to effectuate the self-locking property as long as the worm wheel 3 remains unturned.

Figure 6:
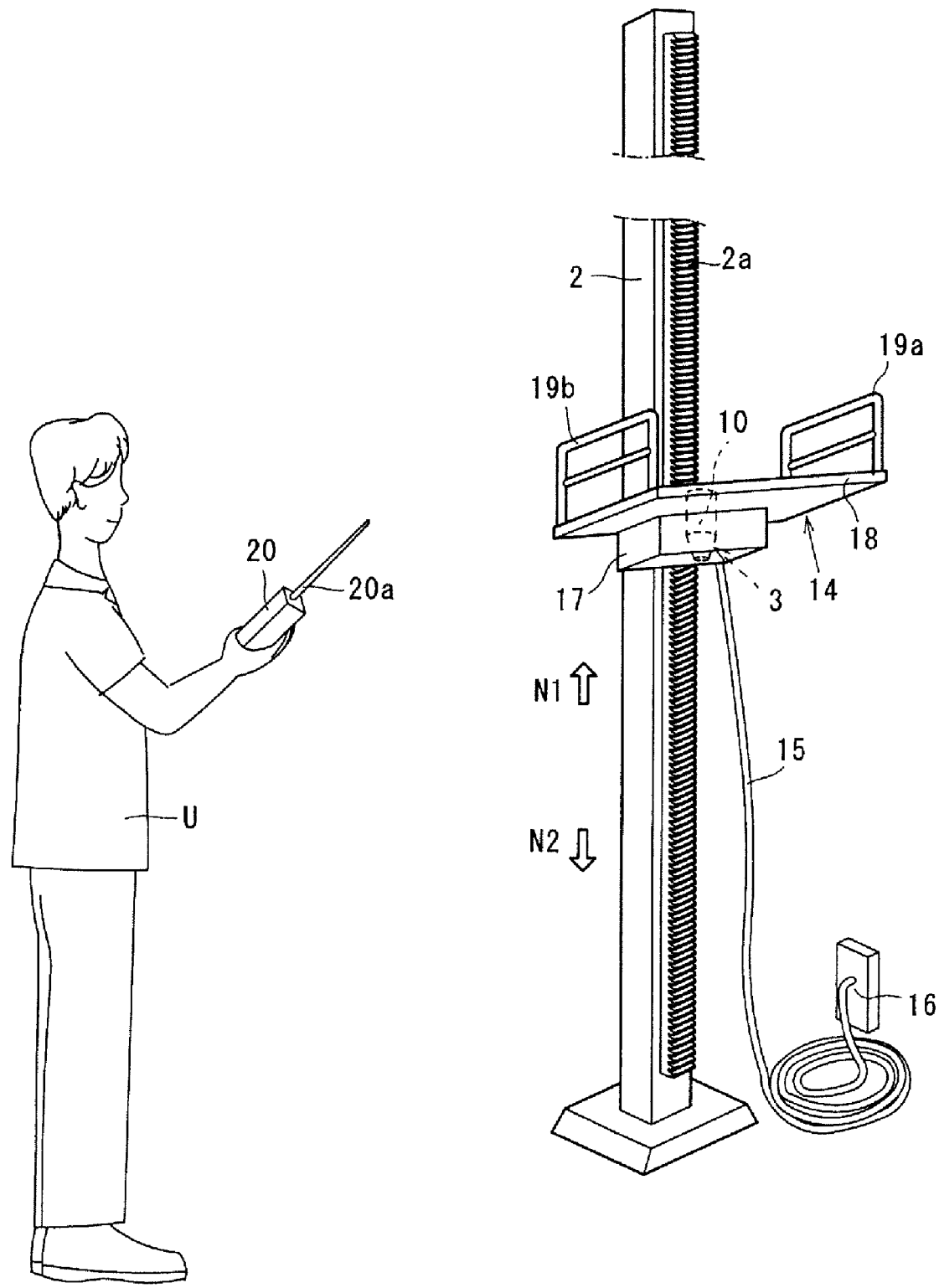
FIG. 6 is a perspective view of a carriage lift, into which the worm-rack type transmission device is incorporated.
Figure 7:
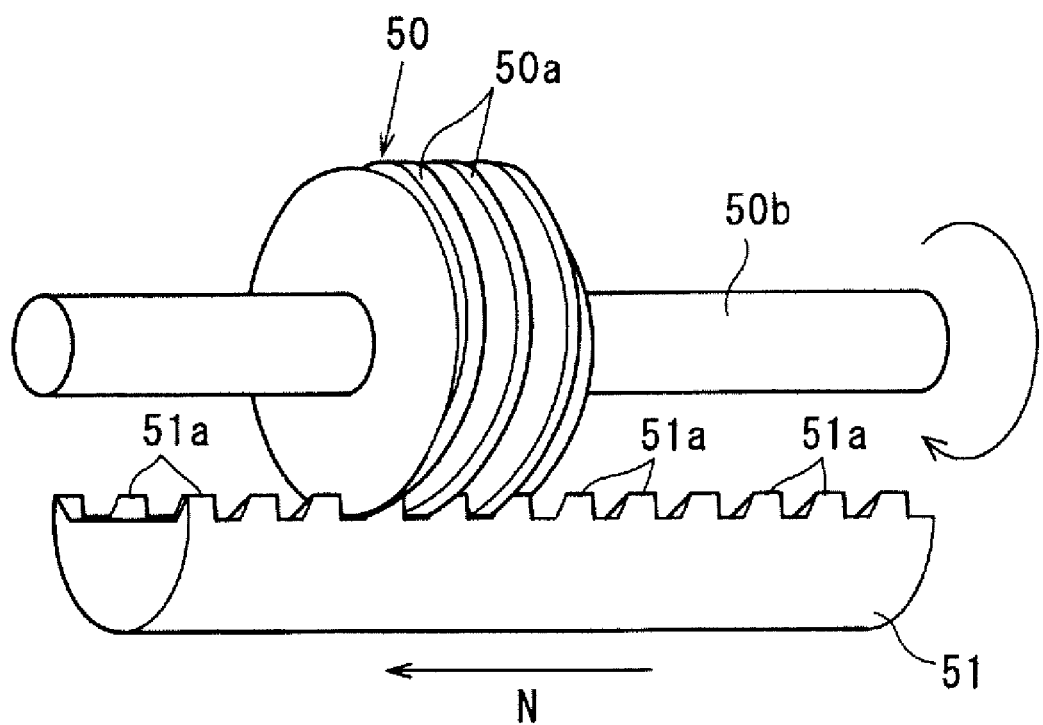
FIG. 7 is a perspective view of a prior worm wheel in which a worm rack engages with a linear rack.
Figure 8:
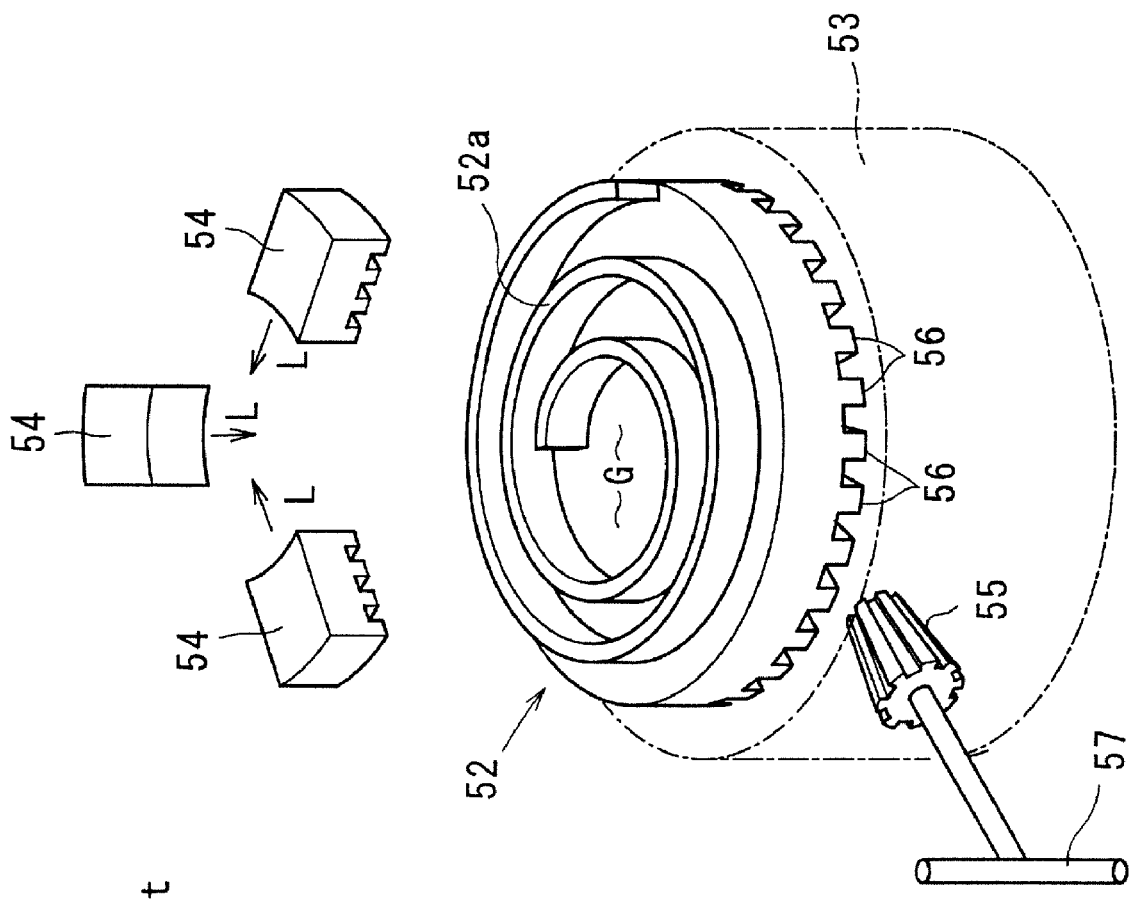
FIG. 8 is an exploded view of a prior scroll chuck device.

FIG. 6 shows a second embodiment of the invention in which the worm-rack type transmission device 1 is incorporated in carriage lift 14. The linear rack 2 is vertically set on a stand with worm wheel 3 placed within the carriage lift 14. The carriage lift 14 is used to carry goods and baggage, or used to send an operator (not shown) to work at a high elevation.

The carriage lift 14 has an accommodation box 17, a horizontal pallet 18 placed on the box 17 and hand rails 19a, 19ba vertically fixed to a right and left side of the pallet 18. Inside the box 17, the worm wheel 3, the housing 8 and the motor 10 are firmly placed. The motor 10 is connected to a power source outlet 16 by way of a conductive cord 15. In FIG. 6, the guide bar 11, the slider plate 12, the guide plate 13 are omitted for the purpose of convenience.

When a user U actuates a remote control device 20 with the goods, baggage or the operator laid on the pallet 18, the motor 10 is energized through an antenna 20a to rotate the worm wheel 3 against the rack teeth 2a so as to move the carriage lift 14 in an up-and-down direction (arrow N1, N2) along the linear rack 2 depending on which direction the motor 10 is activated as the rotational power.

With the self-locking mechanism attained by the worm wheel 3 and the linear rack 2, it is possible to make the carriage lift 14 compact and lightweight due to a simplified power transmission mechanism.

Modification Forms (a) Instead of the iron and mild steel, the linear rack 2 and the worm wheel 3 may be made of the reinforced plastics or reinforced ceramics.

(b) The angle α which the worm wheel 3 forms against the linear rack 2 is not confined to 30 degrees, but it may be within a range of 10-30 degrees. The angle α may be altered as desired depending on using situation, installing circumstances or physical load which the worm wheel 3 owes.

(c) The cross section of the rack teeth 2a and the toothed streak 5 is not confined to the trapezoidal shape but it may be a V-shaped or arcuate-shaped configuration.

As explained above, the curved side portion has the recess profiled by a part of an ellipsoidal surface and is twisted with the changing rate of the torsional manner of the toothed streak, the worm wheel engages the toothed streak with the corresponding curved side portions of the rack teeth in a line-to-line contact. This enables to self-locking property and strengthening a transmission power to insure a high transmission efficiency with a least friction loss so as to effectuate a linear drive for an extended distance travel with a high precision.

Although the invention has been described in its preferred embodiments with reference to a mechanical engineer, various changes or alterations may be made in the above apparatus without departing from the scope of the invention, it is intended that all matters contained in the above description or shown in the accompanying drawings shall be interpreted as illustrative and not in a limiting sense.

What is claimed is:

1. A worm-rack type transmission device comprising:
 a linear rack, an outer surface of which has a large number of rack teeth at predetermined pitch intervals;
 a worm wheel having a frustocone-shaped body, an outer surface of which has a series of a toothed streak helically running therealong in registry with said rack teeth from a minimum diameter portion to a maximum diameter portion of said frustocone-shaped body at the same pitch intervals as said linear rack has;
 a curved side portion provided on a side surface of each of said rack teeth to be in registry with said toothed streak to have a recess profiled by a part of an ellipsoidal surface along a face-width direction of said rack teeth with a major diameter of said ellipsoidal surface in parallel with said rack teeth, said major diameter being a radius of curvature equal to that of any portion of said toothed streak residing from said minimum diameter portion to said maximum diameter portion, said curved side portion being twisted against said face-width along a torsional direction of said toothed streak corresponding to a changing rate of a torsional manner of said toothed streak;
 said worm wheel being placed on said linear rack with said worm wheel inclined to form a predetermined angle against said linear rack, so as to bring said toothed streak into engagement with said curved side portion, so that said worm wheel transmits its rotational movement to said linear rack to convert said rotational movement into a linear movement upon rotationally driving said worm wheel.

2. The worm-rack type transmission device according to claim 1, wherein said ellipsoidal surface has said major diameter equal to a radius of curvature in which said toothed streak resides at said maximum diameter portion, and having a minor diameter equal to a radius of curvature in which said toothed streak resides at said minimum diameter portion.

3. The worm-rack type transmission device according to claim 1, wherein an electric motor is provided to be connected to one end of said worm wheel remote from said linear rack in alignment with said worm wheel.

4. The worm-rack type transmission device according to claim 1, wherein said linear rack is vertically set on a stand, and said worm wheel is incorporated into a carriage lift together with an electric motor.

5. The worm-rack type transmission device according to claim 1, wherein said rack teeth of said linear rack gradually curves zigzag in a sigmoidal fashion along said face-width direction of said rack teeth.

* * * * *